United States Patent Office 3,450,521
Patented June 17, 1969

3,450,521
HERBICIDAL N-HALO-α-HALOACETANILIDES
John F. Olin and Philip C. Hamm, St. Louis County, Mo., assignors to Monsanto Company, St. Louis, Mo., a corporation of Delaware
No Drawing. Original application Apr. 20, 1964, Ser. No. 361,208. Divided and this application Jan. 19, 1967, Ser. No. 627,574
Int. Cl. A01n 9/20
U.S. Cl. 71—118                             9 Claims

ABSTRACT OF THE DISCLOSURE

Phytotoxic compositions containing compounds of the formula

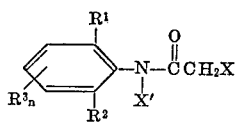

wherein $R^1$ is tertiary alkyl having not more than 10 carbon atoms, $R^2$ and $R^3$ are selected from the class consisting of halogens, alkyl having not more than 8 carbon atoms, and alkoxy having not more than 4 carbon atoms, $n$ is an integer from 0 to 3, X is selected from the class consisting of chlorine, bromine and iodine atoms, and X' is selected from the class consisting of chlorine and bromine atoms.

---

This application is a division of applicants' copending application Ser. No. 361,208, filed Apr. 20, 1964, now abandoned.

This invention relates to the control of plant systems, including germinating seeds, emerging seedlings, and fully developed plants. In one aspect, this invention relates to valuable herbicidal compositions. In another aspect, this invention relates to methods for destroying undesirable plant vegetation without substantially affecting desirable plant vegetation. In another aspect, this invention relates to methods for preventing the germination of seeds of undesirable plants and for preventing the growth of emerging seedlings of said plants. In another aspect, this invention relates to certain N-halo-α-haloacetanilides as new compounds. In another aspect, this invention relates to a process for making the new compounds.

In recent years, the use of chemicals for affecting plant systems has found widespread acceptance among agriculturalists. For example, chemical compositions have been applied to fully developed vegetation to destroy the same in either a selective or non-selective manner. It is relatively easy to destroy the aerial portion of developed vegetation because the vegetation is brought into direct contact with the herbicide composition; however, it is sometimes more difficult to achieve a lethal effect on germinating seeds lying in the soil and seedlings emerging from the soil. The extended control of plant life during the growth of desirable plants is very often involved in preventing the growth of certain undesirable grasses and weeds, such as crab grass, foxtail, and the like. Obviously, a more bountiful growth of desirable grasses and crop plants will result if growth of these undesirable weeds and grasses is prevented before the soil is depleted of moisture and nutrients.

Very useful herbicidal compositions containing certain nuclear-substituted and nitrogen-substituted α-haloacetanilides are disclosed and claimed in U.S. Patent 2,863,752, issued to Hamm and Speziale. Even though these α-haloacetanilides of Hamm and Speziale are effective herbicides, it is desirable in man's continued battle with undesirable plant life to improve the effectiveness of these herbicidal compositions.

In British Patent No. 848,663, there is described the preparation of the compound chloroacetyl-N-chloro-2,6-dimethylanilide. This patent states that this compound is useful as an insecticide, fungicide and germicide. The new compounds of the present invention have been found to be excellent pre-emergent herbicides, and the surprising and unexpected properties of these new compounds as compared to the compound of the British patent are shown below in herbicidal testing.

An object of this invention is to provide novel herbicidal compositions.

Another object of this invention is to provide novel herbicidal compositions having a high unit activity and a wide plant spectrum at low rates of application.

Another object of this invention is to provide novel herbicidal compositions useful for soil sterilization at low rates of application.

Another object of this invention is to provide novel herbicidal compositions which exhibit selectivity in affecting certain undesirable plant systems without affecting desirable plant systems.

Another object of this invention is to provide methods for the suppression and control of vegetation.

Another object of this invention is to provide methods for the suppression and control of undesirable vegetation growing intermingled with desirable vegetation.

Another object of this invention is to provide methods for preventing the germination of seeds of undesirable plants and for preventing the growth of undesirable emerging seedlings in soil which is planted with seeds of desirable vegetation.

Another object of this invention is to provide as new compounds certain N-halo-α-haloacetanilides.

Another object of the invention is to provide a process for making the new compounds of the invention.

Other aspects, objects, and advantages of this invention will be apparent from a consideration of the accompanying disclosure and the appended claims.

According to the present invention there are provided herbicidal concentrate compositions comprising a herbicidal adjuvant and an N-halo-α-haloacetanilide of the formula

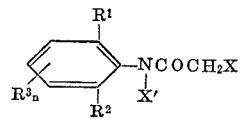

wherein $R^1$ is tertiary alkyl, $R^2$ and $R^3$ are halogens, alkyl or alkoxy, $n$ is 0, 1, 2 or 3, X is a chlorine, bromine or iodine atom, X' is a chlorine or bromine atom.

Also, according to the present invention, there are provided herbicidal compositions comprising a carrier, a herbicide adjuvant and a toxic or growth-inhibiting amount of an N-halo-α-haloacetanilide of the formula as described above.

Also, according to the present invention, there are provided methods for affecting plant systems, including fully developed vegetation as well as germinating seeds and emerging plant seedlings, in a manner to destroy said vegetation and to prevent the growth of said seeds and said emerging seedlings by the application of a toxic or growth-inhibiting amount of N-halo-α-haloacetanilide of the formula as described above.

Also, according to the present invention, there are provided, as new compounds, N-halo-α-haloacetanilides of the formula as described above.

Also, according to the present invention, there is provided a process for preparing the new compounds by reacting the corresponding α-haloacetanilides wherein X' is the hydrogen atom with an N-halogenating agent.

In the N-halo-α-haloacetanilides of this invention $R^1$ in the formula above is a tertiary alkyl radical having at least 4 carbon atoms, and, preferably, not more than 10 carbon atoms, the 4 or 5 carbon tertiary alkyl groups being most desirable. This tertiary alkyl radical may also have further chain branching. Examples of some suitable tertiary alkyl radicals include: tert-butyl, tert-amyl, 1,1,2-trimethylpropyl, 1,1-dimethylbutyl, 1,1-dimethylamyl, 1,1,2-trimethylbutyl, 1,1,3,3-tetramethylbutyl, 1,1,2,3-tetramethylbutyl, 1,1,2,2-tetramethylbutyl, and 1,1-dimethyloctyl groups.

In the formula $R^2$ as a halogen atom can be chlorine, bromine, iodine or fluorine, but is preferably chlorine or bromine. As an alkyl group, $R^2$ can be tertiary alkyl but is preferably primary or secondary alkyl, and preferably contains not more than 8 carbon atoms. Examples of suitable alkyl radicals include methyl, ethyl, isopropyl, n-butyl, sec-butyl, tert-butyl, n-amyl, tert-amyl, n-hexyl, n-heptyl, sec-heptyl, and octyl groups. As an alkoxy group, $R^2$ preferably contains not more than 4 carbon atoms. Examples of suitable alkoxy radicals include: methoxy, ethoxy, n-propoxy, isopropoxy, n-butoxy, and tert-butoxy.

In the formula $R^3$ can be the same or different than $R^2$ or another $R^3$. Especially where an $R^3$ is not a halogen, it is preferred that it be in a meta rather than the paraposition.

In the formula X can be chlorine, bromine and iodine with the two atoms named first, i.e. chlorine and bromine, being preferred.

The compounds of the invention are made by reacting the corresponding α-haloacetanilide with an N-halogenating agent in the presence of an acid-binding agent under weakly alkaline to neutral conditions.

Many α-haloacetanilides suitable for use in the process of the invention are known in the art, e.g. in French Patent No. 1,337,529, issued Aug. 5, 1963, many suitable α-haloacetanilides are described. These acetanilides are of the formula

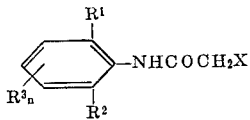

wherein $R^1$, $R^2$, $R^3$, $n$ and X are defined hereinabove.

By an N-halogenating agent is meant a chlorinating agent or brominating agent capable of exchanging for a chlorine or bromine atom the hydroen atom bound to the nitrogen atom of the α-haloacetanilide. Examples of suitable N-halogenating agents for use in the process of the invention are the following: elementary chlorine or bromine, calcium hypochlorite or calcium hypobromite, tertiary butyl hypochlorite or tertiary butyl hypobromite, and the like.

The nature of the acid-binding agent which is used to combine with the hydrogen chloride or hydrogen bromide liberated during the reaction, must be such as to insure that the conditions are never more than weakly alkaline. For this purpose there may be used a mixture of sodium bicarbonate and sodium carbonate, sodium bicarbonate, borax and the like.

The compounds of the invention are especially useful as biological toxicants, especially as herbicides, fungicides, insecticides, nematocides, algaecide, bactericide, bacteriostats and fungistats; however, the great bulk of the compounds of the invention are primarily useful as herbicides, especially pre-emergent herbicides. The compounds of the invention having good herbicidal activity are specifically defined hereinabove.

The invention will be more clearly understood from the following detailed description of specific examples thereof:

EXAMPLE 1

This example describes the preparation of N,2-dichloro-2',6'-dimethylacetanilide. This is the compound of British Patent 848,663. To a 5 liter flask were added 90 g. of sodium bicarbonate, 83 g. (0.4 mole) of 2-chloro-2'-6'-dimethylacetanilide, 1800 g. of ice and 2 liters of water. With good stirring 350 g. of 5% sodium hypochlorite were added to the flask over a ½ hour period. The temperature in the flask was −1° C. The temperature of the reaction mixture was maintained at this temperature of −1° C. for 3 hours, then the flask was packed with ice externally and stirring was continued more slowly overnight. The next morning the temperature of the reaction mixture was 21° C. The solid crude product material was filtered from the reaction mixture and washed with water. The moist, somewhat sticky filter cake was then dissolved in 300 ml. of ether and was filtered. A considerable amount of insoluble material was on the filter and this material was washed with 150 ml. more of ether. The extracts and filtrate were dried with Drierite, were filtered and evaporated at 40° C. on the hot plate. To the residue product remaining in the flask 150 ml. of hexane was added and product began to crystallize from the hexane. The hexane and crystallizing product were placed in a deep freeze and cooled to about 5° C. Then the crystals were filtered to remove them from the hexane. The filtrate was further diluted with 200 ml. of hexane and returned to the deep freeze. A crop of 20 g. of crystals having a melting point of 54–56° C. were separated by filtration. The mother liquor was evaporated some more to about ½ its volume and placed in a deep freeze. 8.5 g. of additional product were recovered having the same melting point and this was combined with the original product to give a total product of 28.5 g. A chlorine analysis of the product yielded 29.8% chlorine as compared to a calculated total chlorine content based on $C_{10}H_{11}Cl_2NO$ of 30.5.

EXAMPLE 2

This example describes the preparation of the product of the invention N,2 - dichloro-2'-tert-butyl-6'-methylacetanilide, 48 g. (0.2 mole) of 2' - tert - butyl-2-chloro-6'-methylacetanilide, 35 g. of sodium bicarbonate, 1 kilogram of ice and 2 liters of water were placed in a 5 liter flask surrounded by an ice bath. With stirring 142 g. of a 5% sodium hypochlorite solution were added to the flask over a period of 1 hour at a temperature of 0–29° C. The reaction mixture was stirred an additional 2 hours at about 0° C., the flask was packed externally with ice and the reaction mixture stirred overnight. The next morning the temperature of the reaction mixture was 24° C. and a sticky semi-solid product was noted. 200 ml. of carbon tetrachloride were added to the reaction mixture which was stirred for 1 hour. The lower carbon tetrachloride layer was removed, was washed with water and was dried with calcium sulfate. The carbon tetrachloride solution of the product was then filtered, diluted with n-heptane and the solution was evaporated to a volume of about 125 ml. The solution was re-filtered, transferred to a beaker and placed in a deep freeze. Material had crystallized out from the solution placed in the deep freeze to give 25 g. of white sandy crystals which were found to be the reactant 2'-tert-butyl-2-chloro-6'-methylacetanilide. The filtrate was then evaporated at room temperature under vacuum yielding a syrup. The syrup did not crystallize and was taken up in 35 ml. of hexane, was filtered and was placed in a deep freeze where it did crystallize yielding 18 g. of peach-colored solid, M.P. 58–62° C. A chlorine analysis of this product yielded a total chlorine content of 24.6% as compared to a calculated chlorine content for $C_{13}H_{17}Cl_2NO$ of 25.9%.

If in the experiment of Example 2 rather than sodium hypochlorite there is used an equimolar amount of sodium hypobromite the resulting product is 2' - tert - butyl - N-bromo-2-chloro-6'-methylacetanilide. Also, if in the experiment of Example 2 rather than 2'-tert-butyl-2-chloro-6'-methylacetanilide there is used 2'-tert-butyl-2-chloro- 6'-chloroacetanilide, 2'-tert-butyl-2-chloro-6'-methoxyacetanilide, 2' - tert - butyl-2-iodo-6'-methylacetanilide or 2-tert - butyl - 2 - bromo-6'-methylacetanilide the resulting products are respectively 2' - tert - butyl-N,2-dichloro-6'-chloroacetanilide, 2' - tert - butyl - N,2 - dichloro - 6'-methoxyacetanilide, 2' - tert - butyl - N - chloro-2-iodo-6'-methylacetanilide and 2' - tert - butyl - N-chloro-2-bromo-6'-methylacetanilide.

EXAMPLE 3

In this example, the pre-emergence herbicidal ratings of two N - halo-α-haloacetanilides were determined in greenhouse tests in which a specific number of seeds of a number of different plants, each representing a principal botanical type, were placed in greenhouse flats. One compound is the product of Example 2 and is a compound of the present invention; whereas, the other compound is the product of Example 1 and is the compound of British Patent No. 848,663.

A good grade of top soil was placed in aluminum pans and compacted to a depth of ⅜ to ½ inch from the top of the plan. On the top of the soil were placed a predetermined number of seeds of each of the following plant species. Morning glory, wild oat, brome grass, rye grass, radish, sugar beet, giant foxtail, crabgrass, pigweed, soybean, wild buckwheat, tomato, sorghum. In some tests seeds of cotton, corn, barnyard grass and rice were also added. The chemical treatments were soil incorporation treatments and the soil required to level fill the pans after seeding was weighted into a pan, a known amount of the chemical applied in a solvent or as wettable powder, the soil thoroughly mixed and used as a cover layer for seeded pans. After treatment the pans were moved into a greenhouse bench where they were watered from below as needed to give adequate moisture for germination and growth.

Approximately 14 days after seeding and treating the plants were observed and the results recorded by counting. The herbicidal rating was obtained by means of a fixed scale based on the average percent germination of each seed lot. The herbicidal ratings are defined as follows:

0—No phytotoxicity
1—Slight phytotoxicity
2—Moderate phytotoxicity
3—Severe phytotoxicity The pre-emergence herbicidal activity of the N-halo-α-haloacetanilides are recorded in Table I. In Table I, the various seeds are represented by letters as follows:

A—General grass
B—General broadleaf
C—Morning glory
D—Wild oats
E—Brome grass
F—Rye grass
G—Radish
H—Sugar beet
I—Cotton
J—Corn
K—Foxtail
L—Barnyard
M—Crab grass
N—Pigweed
O—Soybean
P—Wild buckwheat
Q—Tomato
R—Sorghum
S—Rice Individual injury ratings for each plant type are reported in Table I. In addition, the total injury rating for all grass plants and the total injury rating for all broadleaf plants are also reported in Table I.

The data in Table I illustrate the outstanding general and selective herbicidal activity of an N-halo-α-haloacetanilides of this invention as compared to that of the compound of the British patent.

TABLE I.—PRE-EMERGENCE HERBICIDAL ACTIVITY

| Example No. | Compound | Rate, lb./acre | A | B | C | D | E | F | G | H | I | J | K | L | M | N | O | P | Q | R | S | Total Injury Rating Grass | Total Injury Rating Broadleaf |
|---|---|---|---|---|---|---|---|---|---|---|---|---|---|---|---|---|---|---|---|---|---|---|---|
| 1 | N,2-dichloro-2',6'-dimethylacetanilide. | 5 | 2 | 0 | 0 | 3 | 3 | 2 | 0 | 0 | 0 | 0 | 2 | 1 | 2 | 3 | 0 | 0 | 0 | 1 | 2 | 15 | 3 |
| 2 | 2'-tert-butyl-N,2-dichloro-6'-methylacetanilide. | 0.25 | 2 | 1 | 0 | 1 | 1 | 3 | 0 | 3 | 0 | 0 | 3 | 3 | 2 | 3 | 3 | 0 | 0 | 3 | 1 | 17 | 9 |

From an examination of the herbicidal data in Table I, the unexpected and extraordinarily superior properties as a pre-emergent herbicide of a compound of the invention as compared to the prior art compound are clearly evident. It is clear that the compound of the invention is more than 20 times as effective as a pre-emergent herbicide as the compound of the prior art.

The herbicidal compositions of this invention are either particulate solids (i.e., granules or dusts) or liquid concentrate compositions comprising the active ingredient and either a particulate solid or liquid herbicidal adjuvant which are formulation aids or conditioning agents permitting the concentrate composition to be readily mixed with a suitable solid or liquid carrier in the field for application of the active ingredient on soil or plant surfaces in a toxic concentration in a form which enables prompt assimilation by the germinating seeds, emerging seedlings, or full grown plants. Thus, the herbicidal compositions of this invention include not only the concentrate compositions comprising the active ingredient and the herbicidal adjuvant but also herbicidal toxicant compositions applied in the field comprising the concentrate composition (i.e., active ingredient plus herbicidal adjuvant) and the carrier.

As demonstrated in the examples above, quite different effects can be obtained by modifying the method of use of the herbicidal compositions of this invention. Thus, unusual grass specificity can be achieved at lower levels of application whereas at higher levels of application a more general herbicidal effect or soil sterilization takes place. Therefore, an essential part of this invention is the formulation of the herbicidal composition so as to permit a uniform predetermined application of the composition to the plant environment to produce the desired effect.

Herbicidal adjuvants useful in preparing the concentrate compositions and, therefore, the herbicidal toxicant compositions applied to the soil or plants, include particulate solid or liquid extending agents such as solvents or diluents within which the active ingredient is dissolved or suspended, wetting or emulsifying agents which serve in providing uniform dispersions or solutions of the active ingredient in the extending agents, and adhesive agents or spreading agents which improve the contact of the active ingredient with the soil or plant surfaces. All herbicidal compositions of this invention include at least one of the above types of herbicidal adjuvants and usually include an extending agent and a wetting or emulsifying agent because of the nature of the physical properties of the N-halo-α-haloacetanilides of this invention.

In general, the the N-halo-α-haloacetanilides of this invention are insoluble in water and are not readily soluble in many organic solvents. Therefore, the choice of a liquid extending agent is somewhat limited if it is desired that the active ingredient be in solution in the extending agent. The active ingredient need not be dissolved in the extending agent but may merely be dispersed or suspended in the extending agent as a suspension or emulsion. Also, the N-halo-α-haloacetanilides may first be dissolved in a suitable organic solvent and the organic solution of the active ingredient then incorporated in water or an aqueous extending agent to form a heterogenous dispersion. Examples of some suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., those boiling almost entirely under 400° F. at atmospheric pressure and having flask points above about 80° F., particularly kerosene), and the like. Where true solutions are desired, mixtures or organic solvents have been found to be useful, for example 1:1 and 1:2 mixtures of xylene and cyclohexanone.

Solid extending agents in the form of particulate solids are very useful in the practice of the present invention because of the low solubility properties of the N-halo-α-haloacetanilides of this invention. In using this type of extending agent, the active ingredient is either adsorbed or dispersed on or in the finely-divided solid material. Preferably the solid extending agents are not hygroscopic but are materials which render the composition permanently dry and free flowing. Suitable solid extending agents include the natural clays, such as china clays, the bentonites and the attapulgites; other minerals in natural state, such as talc, pyrophyillite, quartz, diatomaceous earth, Fuller's earth, chalk, rock phosphate, kaolin, kieselguhr, volcanic ash, salts, and sulfur; the chemically modified minerals, such as acid-washed bentonite, precipitated calcium phosphate, precipitated calcium carbonate, calcined magnesia, ad colloidal silica; and other solid materials such as powdered cork, powdered wood and powdered pecan or walnut shells. These materials are used in finely-divided form, as granules in a size range of 16–48 mesh and in much finer sizes as wettable powders or dusts.

When used as a wettable powder, a wetting agent or surface active agent is added to the concentrate composition in order to render the particulate solid extending agent wettable by water to obtain a stable aqueous dispersion or suspension suitable for use as a spray. Also the extending agent applied as a wettable powder is used in very finely-divided form, preferably in a size as small as 100 mesh or smaller.

The surface active agent, that is the wetting, emulsifying, or dispersion agent, used in the herbicidal composition of this invention to serve in providing uniform dispersions of all formulation components of both liquid and dust types in both the concentrate compositions and the toxicant compositions applied, may be either anionic, cationic, or nonionic types, including mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable, and mineral oils; quaternary salts of high molecular weight acids; rosin soaps, such as salts of abietic acid; sulfuric acid salts of high molecular weight organic compounds; algin soaps, ethylene oxide condensated with fatty acids, alkyl phenols and mercaptans; and other simple and polymeric compositions having both hydrophilic and hydrophobic functions.

The herbecidal concentrate compositions of this invention ordinarily have the active ingredient and the surface active agent present in higher concentrations than the toxicant compositions applied in the field so that upon dilution with the liquid or solid carrier, compositions containing optimum proportions of active ingredient and surface active agent are prepared to obtain uniform distribution and to maintain the active ingredient in a form which enabled the prompt assimilation by the plant.

The liquid concentrate compositions of this invention preferably comprise 5% to 95% by weight of the active ingredient and the remainder the herbicidal adjuvant, which may be solely liquid extending agent or surface active agent (including adhesive agent), but preferably is a combination of liquid extending agent and surface active agent; however, normally it is preferred that the herbicidal adjuvant be the major component in the composition, i.e. be present in the composition in excess of 50% by weight. Preferably the surface active agent comprises from 0.1% to 15% by weight of the total concentrate composition. The remainder of the composition is the liquid extending agent.

Use of the surface active agent is necessary in the formulation of liquid concentrate compositions in order to obtain a composition containing a sufficient concentration of the difficulty soluble N-halo-α-haloacetanilide in the liquid extending agent. However, the liquid extending agent must be selected not only on the basis of the amount of the N-halo-α-haloacetanilide dissolved but also upon the basis of the solution temperature of the total composition. Thus, in some formulations, a particular combination of solvents gives a sufficiently low solvent temperature but the amount of the N-halo-α-haloacetanilide dissolved or dispersed in the mixture is insufficient and a suitable surface active agent must be selected in order that more N-halo-α-haloacetanilide can be dispersed in the composition. Preferably, the concentrate composition has a solution temperature below 0° C. although compositions having solution temperatures as high as 20° C. can be used.

The concentration of N-halo-α-haloacetanilide in the particulate solid or dust concentrate composition of this invention may vary over wide ranges depending upon the nature of the solid extending agent and the intended use of the composition. Since the N-halo-α-haloacetanilides of this invention have very high toxicities and are applied at very low rates in order to obtain selectivity, the concentration of the active ingredient in the dust composition may be very low and may comprise as little as 1% or less by weight of the total dust composition. By contrast, when the dust composition is to be used for soil sterilization, it may be desirable to have a very high concentration of active ingredient and for such use the active ingredient may comprise as much as 5% to 98% by weight of the total composition. The remainder of the composition is in the herbicidal adjuvant which is usually only the particulate solid extending agent; however, normally it is preferred that the herbicidal adjuvant be the major component in the composition, i.e. be present in the composition in excess of 50% by weight. Thus, the surface active agent is not usually required in dust concentrate compositions although it can be used is desired. However, if the dust concentrate composition is to be applied as a wettable powder, surface active agent must be added to the concentrate composition and ordinarily the amount of surface active agent will be in the range of 0.1% to 15% by weight of the composition.

The carrier material, used for the uniform distribution of the N-halo-α-haloacetanilide in an herbicidally effective amount to inhibit the growth of either all or selected plants, may be either a liquid or a particulate solid material. Normally, the carrier material will be the major component in the toxicant compositions as applied, and this means the carrier will constitute more than 50% by weight of the toxicant composition. The liquid and solid extending agents used to prepare the concentrate composition may also be used as the carrier; however, the use of these materials as a carrier is often not economical. Therefore, water is the preferred liquid carrier, both for use with the liquid concentrate composition and the wettable powder concentrate. Suitable particulate solid carriers include the particulate extendings agents noted above as well as the solid fertilizers such as ammonium nitrate, urea, and superphosphate, as well as other materials in which plant organisms may take root and grow, such as compost, manure, humus, sand and the like.

The liquid and dust concentrate compositions of this invention can also contain other additaments such as fertilizer and pesticides. Also, these additaments may be used as, or in combination with, the carrier materials.

The herbicidal compositions of this invention are applied to the plant systems in the conventional manner. Thus, the dust and liquid compositions may be applied to the foliage of growing plants by the use of powerdusters, broom and hand sprayers, and spray- dusters. The compositions can also be very suitably applied from airplanes as a dust or a spray because the herbicidal compositions of this invention are effective in a very low dosage. In order to prevent growth of germinating seeds or emerging seedlings, the dust, granular or liquid compositions are applied to the surface of the soil or distributed in the soil to a depth of at least ½ inch below the soil surface, according to conventional methods. The herbicidal compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by the usual discing, dragging, or mixing operations.

The application of a growth-inhibiting amount or toxic amount of the N-halo-α-acetanilide to the plant system is essential in the practice of the present invention. The exact dosage to be applied is dependent not only upon the specific N-halo-α-haloacetanilide but also upon the particular plant species to be controlled and the stage of growth thereof as well as the part of the plant to be contacted with the toxicant. In non-selective foliage treatments, the herbicidal compositions of this invention are usually applied at a rate sufficient to obtain from 5 to 50 lbs. of N-halo-α-haloacetanilide per acre but lower or higher rates may be applied in some cases. In nonselective pre-emergence treatments, these herbicidal compositions are usually applied at a somewhat lower rate than in foliage treatments but at a rate which is ordinarily within the same general range; that is, at a rate in the range of 1 to 25 lbs. per acre. However, because of the unusually high unit activity possessed by the N-halo-α-haloacetanilides of this invention, soil sterilization is ordinarily accomplished at a rate of application in the range of 1 to 10 lbs. per acre. In selective pre-emergence applications to the soil, a dosage of from 0.05 to 5 lbs. of active ingredient per acre is usually employed but lower or higher rates may be necessary in some instances. It is believed that one skilled in the art can readily determine from this disclosure, including the examples, the optimum rate to be applied in any particular case.

What is claimed is:

1. A herbicidal concentrate composition comprising a herbicidal adjuvant and, as an essential active ingredient, an effective amount of a compound of the formula

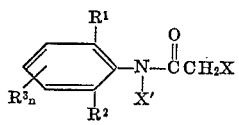

wherein $R^1$ is tertiary alkyl having not more than 10 carbon atoms, $R^2$ and $R^3$ are selected from the class consisting of halogens, alkyl having not more than 8 carbon atoms, and alkoxy having not more than 4 carbon atoms, $n$ is an integer from 0 to 3, X is selected from the class consisting of chlorine, bromine and iodine atoms, and X' is selected from the class consisting of chlorine and bromine atoms.

2. A composition of claim 1 wherein $R^1$ is tertiary alkyl having 4 to 5 carbon atoms, $R^2$ is alkyl, $n$ is 0, X and X' are chlorine atoms.

3. A herbicidal concentrate composition comprising a herbicidal adjuvant and, as an essential active ingredient an effective amount of 2'-tert-butyl-N,2-dichloro-6'-methylacetanilide.

4. A herbicidal toxicant composition comprising a herbicidal adjuvant, a carrier and as an essential active ingredient, a growth-inhibiting amount of a compound of the formula

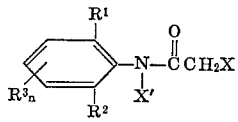

wherein $R^1$ is tertiary alkyl having not more than 10 carbon atoms, $R^2$ and $R^3$ are selected from the class consisting of halogens, alkyl having not more than 8 carbon atoms, and alkoxy having not more than 4 carbon atoms, $n$ is an integer from 0 to 3, X is selected from the class consisting of chlorine, bromine and iodine atoms, and X' is selected from the class consisting of chlorine and bromine atoms.

5. A method for preventing plant growth which comprises applying to the soil normally supporting said growth a growth-inhibiting amount of a compound of the formula

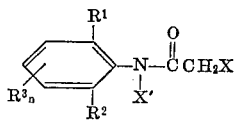

wherein $R^1$ is tertiary alkyl having not more than 10 carbon atoms, $R^2$ and $R^3$ are selected from the class consisting of halogens, alkyl having not more than 8 carbon atoms, and alkoxy having not more than 4 carbon atoms, $n$ is an integer from 0 to 3, X is selected from the class consisting of chlorine, bromine and iodine atoms, and X' is selected from the class consisting of chlorine and bromine atoms.

6. A method for preventing the growth of undesirable plants which comprises distributing on the surface of soil containing seeds of said plants a growth-inhibiting amount of a compound of the formula

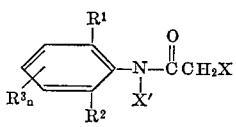

wherein $R^1$ is tertiary alkyl having not more than 10 carbon atoms, $R^2$ and $R^3$ are selected from the class consisting of halogens, alkyl having not more than 8 carbon atoms, and alkoxy having not more than 4 carbon atoms, $n$ is an integer from 0 to 3, X is selected from the class consisting of chlorine, bromine and iodine atoms, and X' is selected from the class consisting of chlorine and bromine atoms.

7. A method for preventing the growth of undesirable plants which comprises intimately admixing soil containing seeds of such plant with a growth-inhibiting amount of compound of the formula

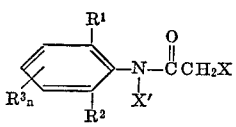

wherein $R^1$ is tertiary alkyl having not more than 10 carbon atoms, $R^2$ and $R^3$ are selected from the class consisting of halogens, alkyl having not more than 8 carbon atoms, and alkoxy having not more than 4 carbon atoms, $n$ is an integer from 0 to 3, X is selected from the class consisting of chlorine, bromine and iodine atoms, and X' is selected from the class consisting of chlorine and bromine atoms.

8. A method for preventing the growth of undesirable plants which comprises contacting the seeds of said plants positioned in the soil with a growth-inhibiting amount of a compound of the formula

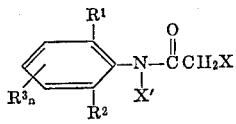

wherein $R^1$ is tertiary alkyl having not more than 10 carbon atoms, $R^2$ and $R^3$ are selected from the class consisting of halogens, alkyl having not more than 8 carbon atoms, and alkoxy having not more than 4 carbon atoms, $n$ is an integer from 0 to 3, X is selected from the class consisting of chlorine, bromine and iodine atoms, and X' is selected from the class consisting of chlorine and bromine atoms.

9. A method for preventing the growth of undesirable plants which comprises impregnating the soil with a growth-inhibiting amount of a compound of the formula

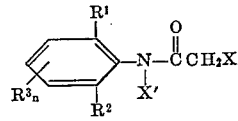

wherein $R^1$ is tertiary alkyl having not more than 10 carbon atoms, $R^2$ and $R^3$ are selected from the class consisting of halogens, alkyl having not more than 8 carbon atoms, and alkoxy having not more than 4 carbon atoms, $n$ is an integer from 0 to 3, X is selected from the class consisting of chlorine, bromine and iodine atoms, and X' is selected from the class consisting of chlorine and bromine atoms.

References Cited

UNITED STATES PATENTS 2,637,752  12/1958  Hamm et al.

FOREIGN PATENTS 622,131  12/1962  Belgium.

LEWIS GOTTS, *Primary Examiner.*

C. L. MILLS, *Assistant Examiner.*